Figure 1:
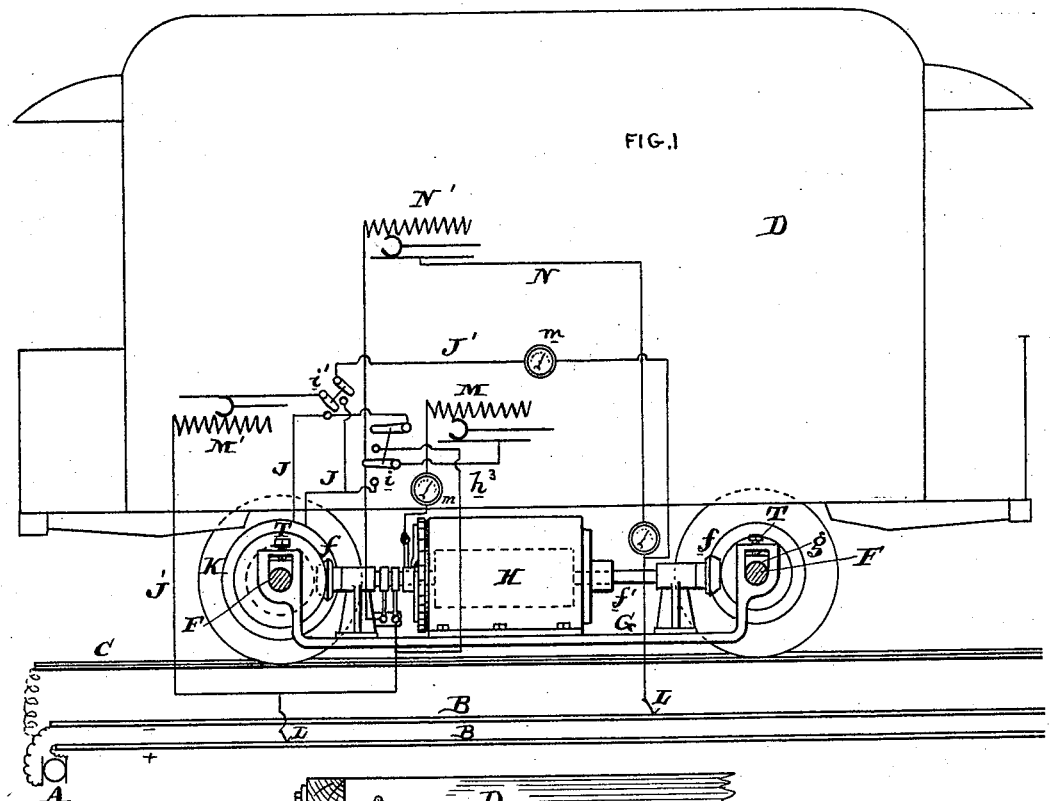

(No Model.)

R. M. HUNTER.
ELECTRIC RAILWAY.

No. 434,391. Patented Aug. 12, 1890.

Attest
Maurice H. Holmes.
S. J. Yerkes.

Inventor
R. M. Hunter

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC RAILWAY.

SPECIFICATION forming part of Letters Patent No. 434,391, dated August 12, 1890.

Original application filed June 9, 1886, Serial No. 204,583. Divided and application filed April 11, 1890, Serial No. 347,509. Again divided and this application filed July 16, 1890. Serial No. 358,883. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification, and shown in the accompanying drawings, which form a part thereof.

This specification (Case 153) is a division of my application, (Case 133,) Serial No. 347,509, filed April 11, 1890, which in turn was a division of my application, Serial No. 204,583, filed June 9, 1886.

My improvements relate to the constructions employed on the car or vehicle for propelling and regulating its movement.

In carrying out my invention, so far as the motor or car is concerned, I provide a motor-frame supported directly or indirectly on the car-axles and made adjustable therewith, and upon this frame I secure the motor, which may be of any desired type, that shown being of the type in which the field-magnets rotate and the armature-ring is stationary. I therefore secure the armature-ring to the frame and connect the rotating field-magnets to the axles by gearing or otherwise. I also provide the armature-circuit with a resistance-changer under the control of the operator for varying the resistance at will. When the motor is to be run as a braking-dynamo, it simply becomes necessary to increase the field by reducing the resistance in the field-circuit and, if desired, increasing the resistance in the armature-circuit, so that the counter electro-motive force shall increase over the initial electro-motive force of the motor. This slows down the car or train, and as it slows the difference between the power of the field and armature must still be increased, as with the reduced speed of the motor the counter electro-motive force also decreases. To stop the car, I provide an electric brake, which may be either coupled up in the line-circuit or in the armature-circuit. The instant the armature is cut out of line it becomes a generator or dynamo-electric machine, and the armature-current is expended in its short circuit in overcoming the resistance, which resistance may be varied by a suitable resistance-changer. When so connected, it also acts as a brake, as the tendency would be to stop or arrest the rotation of the field-magnet. When coupled up with the brake, the armature-circuit (the motor being converted into a generator) transmits a current which actuates the brake, and the strength of this current may be controlled by a variable resistance in said circuit. In the case where the brake-circuit is coupled up into line or in a derived circuit around the motor I also provide a resistance-changer to control the strength of current and thereby regulate the power of the brake.

Figure 2:
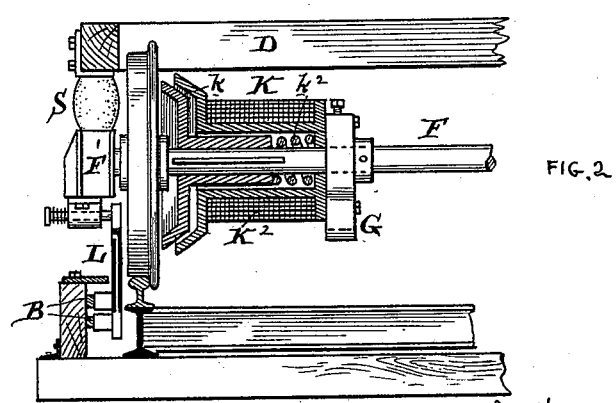
Figure 4:
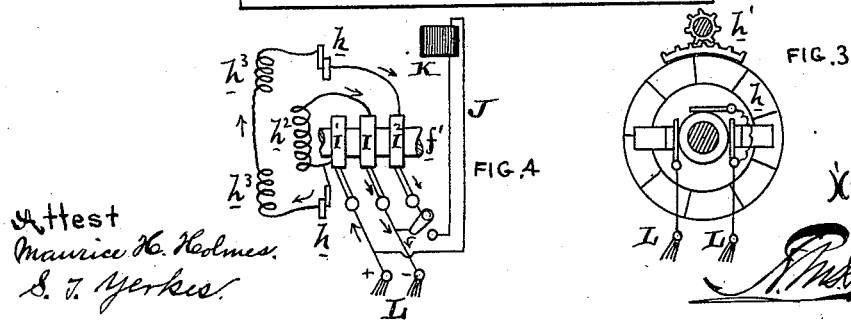
Figure 3:
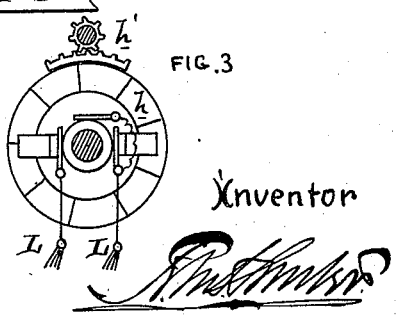

In the drawings, Figure 1 is a sectional elevation of an electric car embodying my invention. Fig. 2 is a cross-section of part of same, showing the brake. Fig. 3 is a front elevation of the motor, showing the commutator segments and brushes; and Fig. 4 is a diagram illustrating the general arrangement of the motor-circuits.

A is the electric generator or source of supply, and B B are the line-conductors when a stationary source of energy is employed. The conductors B may be the rails or separate conductors or part rails and part separate conductors, and the conductor or conductors may be arranged at any elevation or in a conduit, as desired.

D is the car-body, and is supported upon the axles F, journaled in boxes F', by means of springs S in the usual way. When line-conductors are employed, current-collectors L may be carried with the car for making a traveling contact therewith, and are preferably supported by the axles or boxes independent of the car-body.

H is the motor, which is shown as of the well-known type, in which the field-magnets revolve within the stationary armature. These field-magnets are secured upon the shaft $f'$, which is connected by gearing $f$ with the axles F of the car.

N is the motor-circuit, it passing from one brush or collector L through the field-magnets and a resistance-changer N' to the other collector L, and the continuity of the circuit is never broken during the normal working of the motor.

Referring to Fig. 4, $h^2$ represents the field-magnets, and the circuit from the two collectors can be traced through the contact-rings I I' on the field-magnet or motor-shaft $f'$. The armature-coils are represented at $h^3$, and are shown as in a derived circuit around the field-magnets, being in circuit with the positive and negative currents by commutator and brushes $h$, contact-ring $I^2$, and switch $i$. The brushes for the commutator $h$ are carried by the motor-shaft. The commutators $h$ may be moved through a sufficient angle to reverse the motor by gearing $h'$ under the control of the operator with the usual lever-rack and detent device. The armature-circuit also contains a resistance-changer M, by which the amount of current passing through the armature may be regulated.

Referring now to Fig. 1, it will be seen that by moving the switch $i$ up the armature-circuit will be cut out of line and be closed upon itself, including the resistance M. When this is done, the motor will be converted into a dynamo-electric machine, and tends to act as a brake to stop the train. The current generated in the armature-circuit is consumed in overcoming the resistance M, which may be increased as desired. If the switch $i$ be moved down, the armature will still be cut out of line-circuit, but will now include the brake K, the coils $K^2$ of which and circuit J being coupled up with the armature-circuit, so that after the braking-dynamo has slowed down the train it may be stopped by putting on the friction-brake. The power of this friction-brake may be increased or decreased by decreasing or increasing the resistance M. The power of the current generated by the motor may be materially varied by operating the resistance-changer N', which regulates the resistance of the field-magnet circuit, as it is evident that when running the motor as a generator a variation in the strength of the field will cause a corresponding variation in the armature-current.

Aside from operating the friction-brake K by the armature-current, this brake may be operated by the current from the source of supply with or without converting the motor into a generator by a circuit J' and switch $i'$, which closes a shunt-circuit through the brake-coils and a resistance-changer M' and connects with the wires N on each side of the motor, shunting the motor and decreasing its strength. Even while the brake-coils $K^2$ are being traversed by the line-current the motor may be converted into a generator, and the armature-current so generated may also be made to assist in exciting the friction-brake, assisting the line-current in arresting the train or car. The resistance-changer M' regulates the power of the brake when the line-current is used.

The brake shown is very similar to that illustrated in my application filed July 14, 1885, Serial No. 171,625, and consists, essentially, of a helix $K^2$, secured to the frame or car G, and a core K', carried by the axle and rotating with it, but free to move longitudinally thereon. This armature is normally held out of the helix by a spring $k^2$; but when the helix is excited the armature is drawn in and creates a friction by the conical flanges $k$ of the helix-frame and core, as shown in Fig. 2.

The motor H and its frame G may be elevated or lowered by the adjusting-screws T, carried by the upper parts of the frame G, said screws pressing upon adjustable bearings $g$, resting on the axles. This construction enables the gearing to be kept in perfect alignment and allows of more ready adjustment of the motor-shaft with respect to the axles.

I do not limit myself to the details of construction, as they may be modified in various ways without departing from my invention.

Having now described my invention, what I claim as new, and desire to secure by Letters Patent, is—

1. The combination of a railway, a vehicle or car, an electric motor to propel the car, a line-circuit extending along the railway, an electric friction-brake, a brake-circuit for connection with the line-circuit, and switches for coupling the brake-circuit with the armature or line.

2. The combination of a railway, a vehicle or car, an electric motor to propel the car, a line-circuit extending along the railway, an electric friction-brake, a brake-circuit for connection with the line-circuit, switches for coupling the brake-circuit with the armature or line, and a resistance-changer in the brake-circuit.

3. The combination of an electrically-propelled vehicle, an electric motor to propel the car, having a fixed armature and rotating field-magnets, the armature being connected to the frame or vehicle-body and the field-magnets being connected to the axle, a stationary source of electric supply, a supply-conductor arranged along the path of the vehicle independent of the rails, and suitable current-collecting devices independent of the wheels for electrically connecting the motor with said electric-supply conductor.

4. The combination of an electrically-propelled vehicle, an electric motor to propel the same, having a fixed armature and rotating field-magnets, the armature being connected to the frame or vehicle-body and the field-magnets being connected to the axle, a stationary source of electric supply arranged along the path of the vehicle, suitable devices for electrically connecting the motor with said electric supply, and a variable resistance in the motor-circuit to regulate the operation of the motor.

5. The combination of an electrically-propelled vehicle, an electric motor to propel the same, having a fixed armature and rotating field-magnets, the armature being connected to the frame or vehicle-body and the field-magnets being connected to the axle, a stationary source of electric supply arranged along the path of the vehicle, suitable devices for electrically connecting the motor with said electric supply, and a variable resistance in the armature part of the motor-circuit to regulate the operation of the motor.

In testimony of which invention I have hereunto set my hand.

R. M. HUNTER.

Witnesses:
ERNEST HOWARD HUNTER,
LOUIS M. PORTER.